(12) United States Patent
Delling et al.

(10) Patent No.: US 9,222,791 B2
(45) Date of Patent: Dec. 29, 2015

(54) QUERY SCENARIOS FOR CUSTOMIZABLE ROUTE PLANNING

(71) Applicant: Microsoft Corporation, Redmond, WA (US)

(72) Inventors: Daniel Delling, Mountain View, CA (US); Andrew V. Goldberg, Redwood City, CA (US); Renato F. Werneck, San Francisco, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 138 days.

(21) Appl. No.: 13/649,114

(22) Filed: Oct. 11, 2012

(65) Prior Publication Data

US 2014/0107921 A1    Apr. 17, 2014

(51) Int. Cl.
G01C 21/34    (2006.01)

(52) U.S. Cl.
CPC ................... *G01C 21/3446* (2013.01)

(58) Field of Classification Search
CPC . G01C 21/3446; G01C 21/34; G01C 21/3484
USPC .............. 701/537, 533, 532, 527, 439, 43, 3, 701/412, 411, 25, 117; 709/241; 707/748, 707/798
See application file for complete search history.

(56) References Cited

U.S. PATENT DOCUMENTS

| | | | |
|---|---|---|---|
| 6,732,048 B2 | 5/2004 | Blewitt | |
| 6,799,115 B1 * | 9/2004 | Childs et al. | 701/532 |
| 6,963,799 B2 | 11/2005 | Kita et al. | |
| 7,363,126 B1 * | 4/2008 | Zhong et al. | 701/25 |
| 8,103,435 B2 | 1/2012 | Yang et al. | |
| 8,126,641 B2 | 2/2012 | Horvitz | |
| 8,417,448 B1 * | 4/2013 | Denise | 701/410 |
| 2011/0113155 A1 | 5/2011 | Kuznetsov et al. | |
| 2011/0295497 A1 | 12/2011 | Abraham et al. | |
| 2012/0192138 A1 | 7/2012 | Delling et al. | |
| 2012/0254153 A1 | 10/2012 | Abraham et al. | |
| 2012/0283948 A1 * | 11/2012 | Demiryurek et al. | 701/533 |
| 2013/0198240 A1 * | 8/2013 | Ameri-Yahia et al. | 707/798 |

OTHER PUBLICATIONS

Abraham, et al., "Alternative Routes in Road Networks", Retrieved at <<http://research.microsoft.com/pubs/121750/alternativesea2010.pdf>>, In Proceedings 9th International Symposium Experimental Algorithms, SEA 2010, Ischia Island, Naples, Italy, May 20, 2010, pp. 12.

(Continued)

*Primary Examiner* — Helal A Algahaim
*Assistant Examiner* — Jelani Smith
(74) *Attorney, Agent, or Firm* — Sandy Swain; Steve Wight; Micky Minhas

(57) ABSTRACT

A point-to-point shortest path technique supports real-time queries and fast metric update or replacement (metric customization). Determining a shortest path between two locations uses three stages: a preprocessing stage, a metric customization stage, and a query stage. Extensions to the customizable route planning (CRP) technique for routing are provided. These extensions include, for example, the computation of alternative routes, faster techniques for unpacking shortcuts, efficient query techniques for batched shortest path (one-to-many, many-to-many, and points of interest) determinations, and determining routes and alternative routes using traffic information.

12 Claims, 11 Drawing Sheets

(56) References Cited

OTHER PUBLICATIONS

Knopp, et al., "Computing Many-to-Many Shortest Paths Using Highway Hierarchies", Retrieved at <<http://algo2.iti.kit.edu/documents/routeplanning/distTable.pdf>>, In Proceeding of the 9th Workshop on Algorithm Engineering and Experiments (ALEXEX'07), Jan. 6, 2007, pp. 10.

Dees, et al., "Defining and Computing Alternative Routes in Road Networks", Retrieved at <<http://arxiv.org/pdf/1002.4330.pdf>>, Technical Report, Fakultät für Informatik, Karlsruher Institut fur Technologie, Feb. 23, 2010, pp. 10.

"Customizable Route Planning", U.S. Appl. No. 13/152,313, filed Jun. 3, 2011, pp. 23.

"Batched Shortest Path Computation", U.S. Appl. No. 13/298,297, filed Nov. 17, 2011, pp. 30.

Delling, et al., "Customizable Route Planning", Retrieved at <<http://research.microsoft.com/pubs/145688/crp-sea.pdf>>, Proceedings: In Proceedings of the 10th International Symposium on Experimental Algorithms, May 2011, pp. 12.

Jung, et al., "An Efficient Path Computation Model for Hierarchically Structured Topographical Road Maps", Retrieved at <<http://ieeexplore.ieee.org/stamp/stamp.jsp?arnumber=01033772>>, Proceedings: In IEEE Transactions on Knowledge and Data Engineering, vol. 14, Issue 5, Sep. 2002, pp. 18.

* cited by examiner

QUERY SCENARIOS FOR CUSTOMIZABLE ROUTE PLANNING

BACKGROUND

Existing computer programs known as road-mapping programs provide digital maps, often complete with detailed road networks down to the city-street level. Typically, a user can input a location and the road-mapping program will display an on-screen map of the selected location. Several existing road-mapping products typically include the ability to calculate a best route between two locations. In other words, the user can input two locations, and the road-mapping program will compute the travel directions from the source location to the destination location. The directions are typically based on distance, travel time, etc. Computing the best route between locations may require significant computational time and resources.

Some road-mapping programs compute shortest paths using variants of a well known method attributed to Dijkstra. Note that in this sense "shortest" means "least cost" because each road segment is assigned a cost or weight not necessarily directly related to the road segment's length. By varying the way the cost is calculated for each road, shortest paths can be generated for the quickest, shortest, or preferred routes. Dijkstra's original method, however, is not always efficient in practice, due to the large number of locations and possible paths that are scanned. Instead, many known road-mapping programs use heuristic variations of Dijkstra's method.

More recent developments in road-mapping algorithms utilize a two-stage process comprising a preprocessing phase and a query phase. During the preprocessing phase, the graph or map is subject to an off-line processing such that later real-time queries between any two destinations on the graph can be made more efficiently. Known examples of preprocessing algorithms use geometric information, hierarchical decomposition, and A* search combined with landmark distances.

Customizable route planning (CRP) is a fast technique for computing point-to-point shortest paths in road networks. It relies on three phases: preprocessing, customization, and queries. The preprocessing partitions the graph into multiple levels of loosely connected components of bounded size and creates an overlay graph for each level by replacing each component with a distance-preserving clique connecting its boundary vertices. Clique edge lengths are computed during the customization phase. The query phase uses a bidirectional Dijkstra's algorithm operating on the union of the overlay graphs and the components of the original graph containing the origin and the destination. This search graph is much smaller than the input graph, leading to fast queries. However, CRP has been restricted to simple query scenarios such as point-to-point queries. Extensions to other techniques exist, but are too sensitive to metric changes.

SUMMARY

Extensions to the customizable route planning (CRP) technique for routing in road networks are provided. These extensions include, for example, the computation of alternative routes, faster techniques for unpacking shortcuts, efficient query techniques for batched shortest path (one-to-many, many-to-many, and points of interest) determinations, and determining routes and alternative routes using traffic information.

In some implementations, techniques are provided for computing driving directions. These techniques support arbitrary non-negative metrics (cost functions), along with turn costs and alternative routes. They also yield real-time queries, and can incorporate additional metrics quickly enough to support real-time traffic updates and personalized optimization functions. The amount of metric-specific data is a small fraction of the graph itself, which allows several metrics to be maintained in memory simultaneously.

In an implementation, determining a shortest path between two locations uses three stages: a preprocessing stage, a metric customization stage, and a query stage. Preprocessing is based on a graph structure only, while metric customization augments preprocessing results taking edge costs into account. A graph may comprise a set of vertices (representing intersections) and a set of edges or arcs (representing road segments). Additional data structures may be used to represent turn restrictions and penalties.

In an implementation, the preprocessing partitions the graph into loosely connected components (or cells) of bounded size and creates an overlay graph by replacing each component with a "clique" (complete graph) connecting its boundary vertices. The preprocessing phase does not take edge costs into account, and is therefore metric-independent. Clique edge lengths are computed during the customization phase and stored separately. The customization phase can be repeated for various different metrics, and produces a small amount of data for each.

In an implementation, the query phase is run using the metric-independent data together with the relevant metric-specific data. The query phase may use a bidirectional version of Dijkstra's algorithm operating on the union of the overlay graph and the components of the original graph containing the origin and the destination. This graph is much smaller than the input graph, leading to fast queries. Multiple overlay levels may be used to achieve further speedup.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
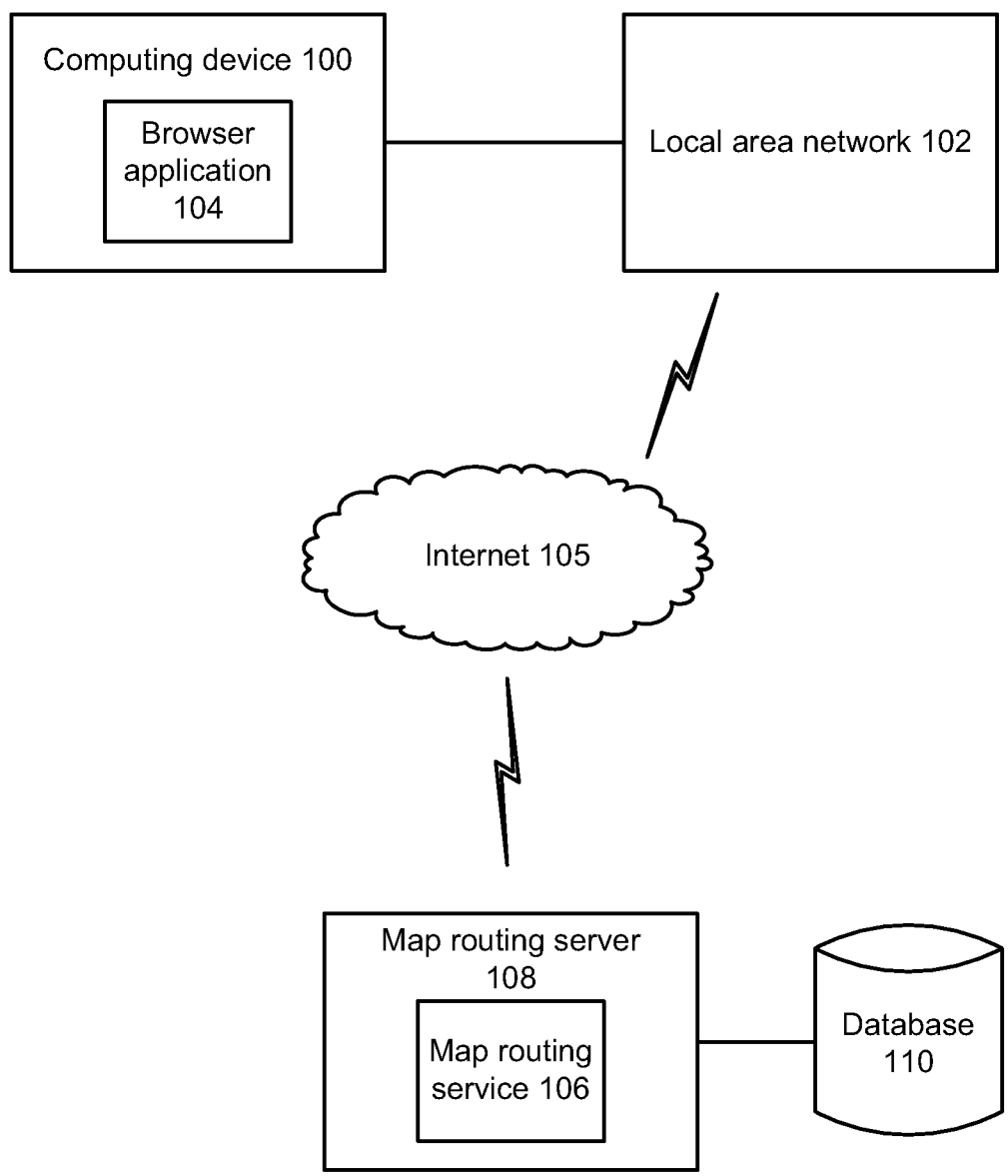
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), smart phone, cell phone, or any WAP-enabled device or any other computing device capable of interfacing directly or indirectly with a network. An example computing device 100 is described with respect to the computing device 1100 of FIG. 11, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a map routing service 106, running on a map routing server 108. The map routing server 108 hosts a database 110 of physical locations and street addresses, along with routing information such as adjacencies, distances, speed limits, and other relationships between the stored locations. The database 110 may also store information pertaining to metrics.

A user of the computing device 100 typically enters start and destination locations as a query request through the browser application 104. The map routing server 108 receives the request and produces a shortest path among the locations stored in the database 110 for reaching the destination location from the start location. The map routing server 108 then sends that shortest path back to the requesting computing device 100. Alternatively, the map routing service 106 is hosted on the computing device 100, and the computing device 100 need not communicate with a local area network 102.

The point-to-point (P2P) shortest path problem is a classical problem with many applications. Given a graph G with non-negative arc lengths as well as a vertex pair (s,t), the goal is to find the distance from s to t. The graph may represent a road map, for example. For example, route planning in road networks solves the P2P shortest path problem. However, there are many uses for an algorithm that solves the P2P shortest path problem, and the techniques, processes, and systems described herein are not meant to be limited to maps.

Thus, a P2P algorithm that solves the P2P shortest path problem is directed to finding the shortest distance between any two points in a graph. Such a P2P algorithm may comprise several stages including a preprocessing stage and a query stage. The preprocessing phase may take as an input a directed graph. Such a graph may be represented by G=(V,E), where V represents the set of vertices (also referred to herein as nodes) in the graph and E represents the set of edges or arcs in the graph. The graph comprises several vertices (points), as well as several edges. On a road network, the vertices may represent intersections, and the edges may represent road segments. The preprocessing phase may be used to improve the efficiency of a later query stage, for example.

During the query phase, a user may wish to find the shortest path between two particular nodes. The origination node may be known as the source vertex, labeled s, and the destination node may be known as the target vertex labeled t. For example, an application for the P2P algorithm may be to find the shortest distance between two locations on a road map. Each destination or intersection on the map may be represented by one of the nodes, while the particular roads and highways may be represented by an edge. The user may then specify their starting point s and their destination t. Alternatively, s and t may be points along arcs as well. The techniques described herein may also be used if the start and destination are not intersections, but points alongside a road segment (e.g., a particular house on a street).

Thus, to visualize and implement routing methods, it is helpful to represent locations and connecting segments as an abstract graph with vertices and directed edges. Vertices correspond to locations, and edges correspond to road segments between locations. The edges may be weighted according to the travel distance, transit time, and/or other criteria about the corresponding road segment. The general terms "length" and "distance" are used in context to encompass the metric by which an edge's weight or cost is measured. The length or distance of a path is the sum of the weights of the edges contained in the path. For manipulation by computing devices, graphs may be stored in a contiguous block of computer memory as a collection of records, each record representing a single graph node or edge along with some associated data. Not all the data must be stored with the graph; for example, the actual edge weights may be stored separately.

Arcs and turns have properties such as physical length, speed limit, height or weight restriction, tolls, road category (e.g., highway, rural road, etc.), turn type (e.g., "left turn with stop sign", etc.). A metric is a function that maps properties to costs, such as fastest, shortest, avoid highways, avoid tolls, no U-turns, etc. Metrics may share the same underlying graph.

For customizable route planning (CRP), real-time queries may be performed on road networks with arbitrary metrics. Such techniques can be used to keep several active metrics at once (e.g., to answer queries for any of them), or so that new metrics can be generated on the fly, for example. Customizable route planning supports real-time traffic updates and other dynamic query scenarios, allows arbitrary metric customization, and can provide personalized driving directions (for example, for a truck with height and weight restrictions).

The information associated with the network can be split into two elements: the topology and a metric. The topology includes the set of vertices (intersections) and edges (road segments), and how they relate to one another. It also includes a set of static properties of each road segment or turn, such as physical length, road category, speed limits, and turn types. A metric encodes the actual cost of traversing a road segment (i.e., an edge) or taking a turn. A metric may be described compactly, as a function that maps (in constant time) the static properties of an edge or turn into a cost. As used herein, the topology is shared by the metrics and rarely changes, while metrics may change often and may coexist.

Figure 2:
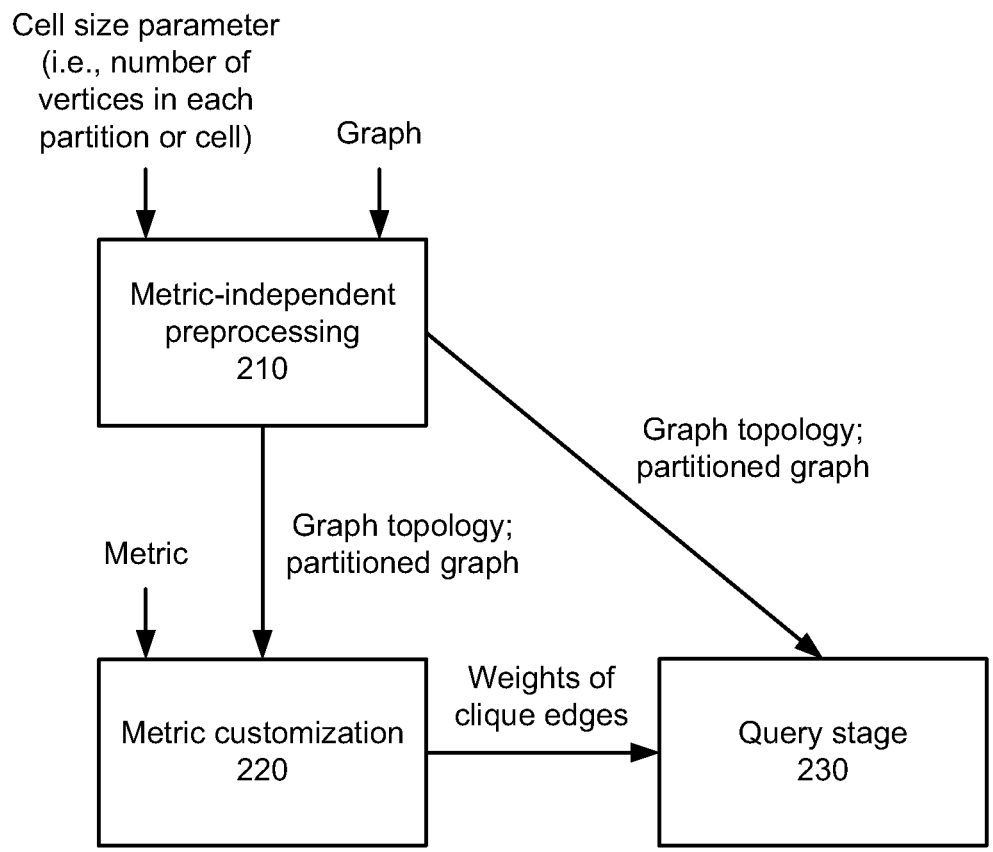
FIG. 2 is a diagram illustrating three stages of an implementation of customizable route planning.

Techniques for customizable route planning comprise three stages, as shown in the high level diagram of FIG. 2. A first stage, at 210, is referred to as metric-independent preprocessing. This preprocessing takes the graph topology as input, and may produce a fair amount of auxiliary data (comparable to the input size). The second stage, at 220, is metric customization, and is run once for each metric, is fast (e.g., on the order of a few seconds), and produces little data—an amount that is a small fraction of the original graph. One of the inputs to the metric customization stage is a description of the metric. In this manner, the metric customization knows (implicitly or explicitly) the cost of every road segment or turn. The third stage, at 230, is the query stage. The query stage uses the outputs of the first two stages and is fast enough for real-time applications.

A metric customization technique may be used in the determination of point-to-point shortest paths. In implementations, the metric customization time, the metric-dependent space (excluding the original graph), and the query time, are minimized. Although examples herein may refer to travel times and travel distances, the techniques may be used for any metric.

Figure 3:
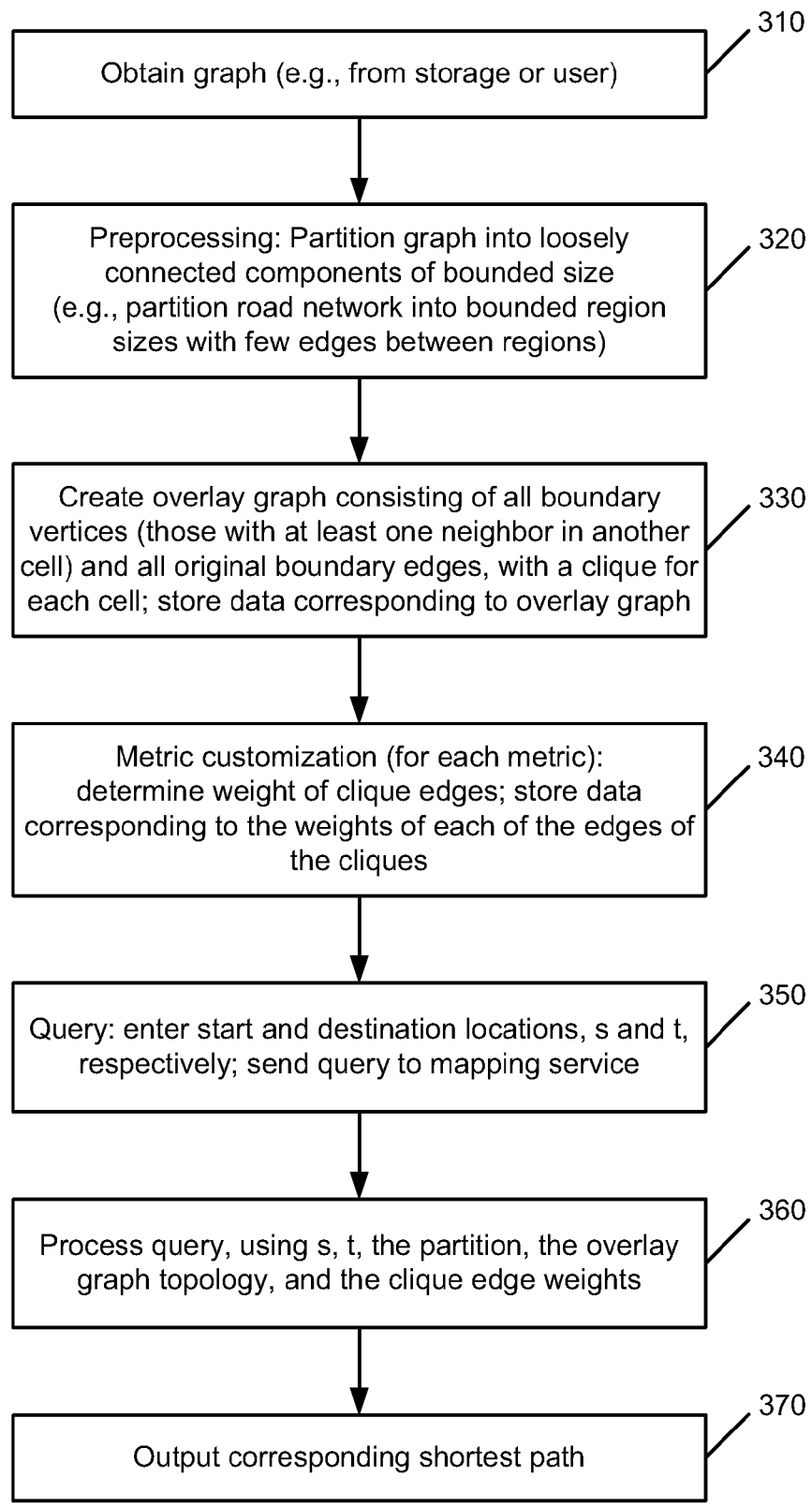
FIG. 3 is an operational flow of an implementation of a method using a metric customization technique for determining a shortest path between two locations.

FIG. 3 is an operational flow of an implementation of a method 300 using a metric customization technique for determining a shortest path between two locations. At 310, a graph is obtained, e.g., from storage or from a user.

During a preprocessing stage, the graph is partitioned into loosely connected components of bounded size at 320. In an implementation, this operation partitions the road network into bounded region sizes with few edges between regions. At 330, an overlay graph is created by replacing each component with a complete graph (a "clique") connecting its boundary vertices. Preprocessing performs the partition and builds the overlay graph (i.e., the cliques), but without taking edge weights into account. Thus, at 330, an overlay graph is created, comprising the boundary vertices (those with at least one neighbor in another cell) and the original boundary edges, together with a clique for each cell.

More particularly, given the graph G(V,E) as an input along with an input parameter U, a partition into cells with at most U vertices each is generated with as few boundary arcs (arcs with endpoints in different cells) as possible, and an overlay graph is created. This preprocessing stage is metric-independent and ignores edge costs.

Any known method, such as the well-known PUNCH technique, may be used to partition the graph. Recently developed to deal with road networks, PUNCH routinely finds solutions with half as many boundary edges (or fewer), compared to the general-purpose partitioners (such as METIS) commonly used by previous algorithms. Better partitions reduce customization time and space, leading to faster queries.

The overlay graph H created during preprocessing contains all boundary vertices in the partition, i.e., all vertices with at least one neighbor in another cell. It also includes all boundary edges (i.e., every edge whose endpoints are in different cells). Finally, for each cell C, it contains a complete graph (a clique) between its boundary vertices. For every pair (v,w) of boundary vertices in C, H contains an arc (v,w).

The preprocessing is based on the graph structure without any edge costs, while subsequent metric customization augments the preprocessing results by taking edge costs into account. For the customization stage, the distances between the boundary nodes in each cell are determined. Therefore, during a metric customization stage, given the input of graph G=(V,E), a partition of V, and the overlay graph topology, the weights of clique edges are determined. Clique edge weights (i.e., lengths) are thus computed during the customization phase (i.e., the metric customization stage assigns weights to the edges of the cliques). This stage can be repeated for various different metrics, and produces a small amount of data for each.

More particularly, during the metric customization stage, at 340, for every pair (v, w) of boundary vertices in C, the cost of the clique arc (v, w) is set to the length of the shortest path (restricted to C) between v and w (or infinite if w is not reachable from v). This may be performed by running a Dijkstra computation from each boundary vertex u restricted to the cell containing u. Note that, with these costs, H is an overlay: the distance between any two vertices in H is the same as in G. Thus, by separating metric customization from graph partitioning, new metrics may be processed quickly.

At query time, at 350, a user enters start and destination locations, s and t, respectively (e.g., using the computing device 100), and the query (e.g., the information pertaining to the s and t vertices) is sent to a mapping service (e.g., the map routing service 106). The s-t query is processed at 360 using the partition, the overlay graph topology, and the clique edge weights. Depending on the implementation, one can have arbitrarily many queries after a single customization operation. The query is processed using the metric-independent data together with the relevant metric-specific data. A bidirectional version of Dijkstra's algorithm is performed on the union of the overlay graph H and the components of the original graph G containing the origin and the destination. (A unidirectional algorithm can also be used.) Thus, to perform a query between s and t, run a bidirectional version of Dijkstra's algorithm on the graph consisting of the union of H, $C_s$, and $C_t$. (Here $C_v$ denotes the subgraph of G induced by the vertices in the cell containing v.) This graph is much smaller than the input graph, leading to fast queries. The corresponding path (the distance between s and t) is outputted to the user at 370 as the shortest path.

The customizable route planning technique may be improved using a variety of techniques, such as multiple overlay levels, turn tables (e.g., using matrices), stalling, and path unpacking.

Multiple overlay levels may be used to achieve further speedup. In other words, to accelerate queries, multiple levels of overlay graphs may be used. Instead of using a single parameter U as input, one may use a sequence of parameters $U_1, \ldots, U_k$ of increasing value. Each level is an overlay of the level below. Nested partitions of G are obtained, in which every boundary edge at level i is also a boundary edge at level i−1, for i>1. The level-0 partition is the original graph, with each vertex as a cell. For the i-th level partition, create a graph $H_i$ that includes all boundary arcs at level i, plus an overlay linking the boundary vertices within a cell. The well-known PUNCH technique, for example, may be used to create multilevel partitions, in top-down fashion. With multiple levels, an s-t query runs bidirectional Dijkstra on a restricted graph $G_{st}$. An arc (v,w) from $H_i$ will be in $G_{st}$ if both v and w are in the same cell as s or t at level i+1. The weights of the clique edges in $H_i$ can be computed during the metric customization phase using only $H_{i-1}$.

In an implementation, the weights of the clique edges corresponding to each cell of the partition may be represented as a matrix containing the distances among the cell's entry and exit vertices (these are the vertices with at least one incoming or outgoing boundary arc, respectively; most boundary vertices are both). These distances can be represented as 32-bit integers, for example. To relate each entry in the matrix to the corresponding clique edge, one may use arrays to associate rows (and columns) with the corresponding vertex IDs. These arrays are small and can be shared by the metrics, since their meaning is metric-independent. Compared to a standard graph representation, matrices use less space and can be accessed more cache-efficiently.

Thus far, only a standard representation of road networks has been considered, with each intersection corresponding to a single vertex. This does not account for turn costs or restrictions. Any technique can handle turns by working on an expanded graph. A conventional representation is arc-based: each vertex represents one exit point of an intersection, and each arc is a road segment followed by a turn. This representation is wasteful in terms of space usage, however.

Instead, a compact representation may be used in which each intersection on the map is represented as a single vertex with some associated information. If a vertex u has p incoming arcs and q outgoing arcs, associate a p×q turn table $T_u$ to it, where $T_u[i,j]$ represents the turn from the i-th incoming arc into the j-th outgoing arc. In an example customizable setting, each entry represents a turn type (such as "left turn with stop sign"), since the turn type's cost may vary with different metrics. In addition, store with each arc (v,w) its tail order (its position among v's outgoing arcs) and its head order (its position among w's incoming arcs). These orders may be arbitrary. Since vertex degrees are small on road networks, four bits for each may suffice.

Turn tables are determined for each intersection on the map. It is often the case that many intersections share the exact same table. Each unique table is an intersection type. To save space, each type of intersection (turn table) may be stored in a memory or storage device only once and is assigned a unique identifier. Instead of storing the full table, each node stores just the identifier of its intersection type. This is a small space overhead. On typical continental road networks, the total number of such intersection types is modest—in the thousands rather than millions. For example, many vertices in the United States represent intersections with four-way stop signs.

To support the compact representation of turns, turn-aware Dijkstra is used on the lowest level (but not on higher ones), both for metric customization and queries. Matrices in each cell represent paths between incoming and outgoing boundary arcs (and not boundary vertices, as in the representation without turns). The difference is subtle. With turns, the distance from a boundary vertex v to an exit point depends on whether the cell is entered from an arc (u,v) or an arc (w,v), so each arc has its own entry in the matrix. Since most boundary vertices have only one incoming (and outgoing) boundary arc, the matrices are only slightly larger.

As described so far, queries may find a path from the source s to the destination t in the overlay graph (i.e., compute the distance between two points). In an implementation, following the parent pointers of the meeting vertex of forward and backward searches, a path is obtained with the same length as the shortest s-t path in the original graph G, but it may contain shortcuts. If the full list of edges in the corresponding path in G is to be obtained, one may perform a path unpacking routine.

In an implementation, each of the shortcuts is translated to the path it represents, i.e., unpacked, to obtain the complete path description as a sequence of edges (or vertices) in the original graph. One approach is to store this information for each shortcut explicitly. However, this is wasteful in terms of space. Instead, recursive unpacking of level-i shortcuts may be performed by running bidirectional Dijkstra on level i−1, restricted to the cells of the shortcuts. This does not increase the metric-dependent space consumption, and query times are still small enough for the price of higher (but still reasonable) query times.

Thus, path unpacking consists of repeatedly converting each level-i shortcut into the corresponding arcs (or shortcuts) at level i−1. To unpack a level-i shortcut (v,w) within cell C, run bidirectional Dijkstra on level i−1 restricted to C to find the shortest v-w path using only shortcuts at level i−1. The procedure is repeated until no shortcuts remain in the path (i.e., until all edges are at level 0).

Running bidirectional Dijkstra within individual cells is usually fast enough for path unpacking. Using four processing cores as an example, unpacking less than doubles query times, with no additional customization space. For even faster unpacking, one can compute additional information to limit the search spaces further. One can store a bit with each arc at level i indicating whether it appears in a shortcut at level i+1. In other words, during customization, mark the arcs with a single bit to show that it is part of a shortcut. Thus, during queries involving unpacking, one only has to look at arcs that have the bit set.

Faster unpacking may be achieved using shortcuts. As described above, for some implementations of CRP, clique edges are unpacked to their original edges by running multiple local bidirectional Dijkstra searches. In other implementations however, storage of the computing device 100, such as a cache like a least recently used (LRU) cache, may be used for the unpacking of clique edges, which greatly accelerates unpacking. This may be particularly desirable when computing alternatives.

Figure 4:
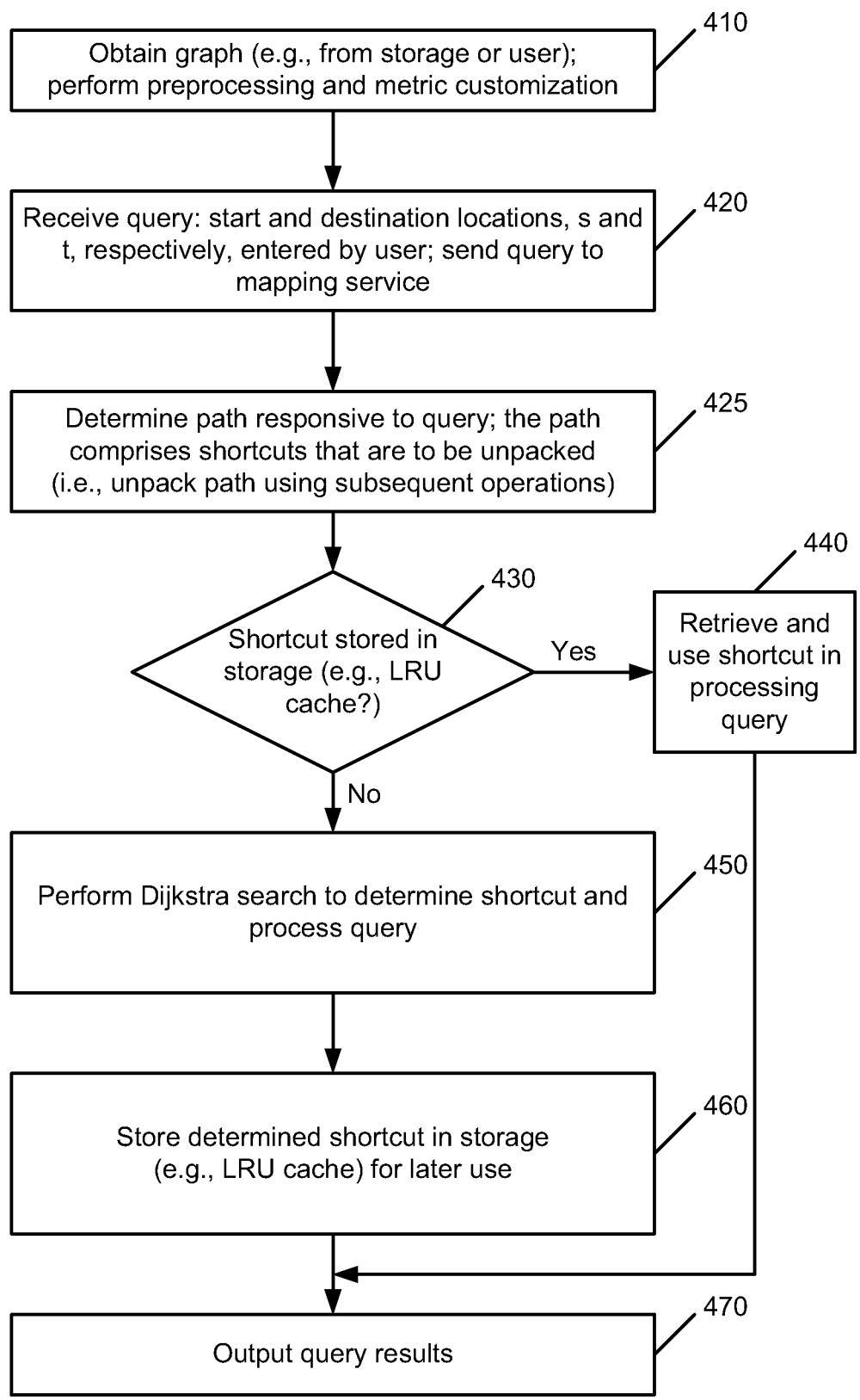
FIG. 4 is an operational flow of an implementation of a method of path unpacking using shortcuts and storage.

FIG. 4 is an operational flow of an implementation of a method 400 of path unpacking using shortcuts and storage, such as a LRU cache. At 410, a graph is obtained, e.g., from storage or from a user, and preprocessing and metric customization may be performed using techniques set forth above, for example. At query time, at 420, a query is received. For example, a user enters start and destination locations, s and t, respectively (e.g., using the computing device 100), and the query (e.g., the information pertaining to the s and t vertices) is sent to a mapping service (e.g., the map routing service 106).

At 425, a path is determined responsive to the query. The path comprises shortcuts that need to be unpacked (i.e., the path needs to be unpacked). At 430, the LRU cache is checked to determine if a shortcut for the query has already been stored. If the shortcut is already stored, it will be used at 440 in the generation of the query results; otherwise, a bidirectional Dijkstra search is performed at 450 and the result is stored in the LRU cache 460 as a shortcut for later use. The query results are outputted at 470, e.g., to the user or to storage. In this manner, the query is answered with a path with shortcuts that are subsequently unpacked.

In some implementations, only certain shortcuts may be stored in the storage (e.g., the LRU cache), such as those that are used frequently and/or those that may be used frequently. A counter may be used to count the number of times a shortcut is used. The cache has a certain size. In some implementations, as soon as the cache is full, an eviction routine may be used to delete certain shortcuts from the cache. In some implementations, periodically, or at predetermined times, for example, the number of times a shortcut has been used may be compared to a threshold, and if the number is below the threshold, the shortcut may be deleted from the cache. Alternatively or additionally, if the number is less than the number corresponding to one or more other shortcuts, that shortcut with the lowest (or lower) number may be deleted from the LRU cache. Similarly, a shortcut may be deleted from the LRU cache if it has not been used in a certain amount of time, or if the capacity of the LRU cache is about to be exceeded.

Therefore, in some implementations, the unpacking of frequently used shortcuts may be accelerated by using a LRU cache. In this cache, store a level-i shortcut as a sequence of level-(i−1) shortcuts. There may be one cache with all shortcuts instead of having one cache for each level. However, if even faster unpacking times are needed, one could store a bit with each arc at level i indicating whether it appears in a shortcut at level i+1, as explained above.

Modern map services do more than just computing point-to-point shortest paths. More sophisticated functionality is desirable, for example finding the closest points of interest (like restaurants), computing routes that obey the current traffic situation, determining isochrones, or computing good alternative routes.

In many applications, all distances between a source vertex and a target set are sought. This is the well-known one-to-many problem. In other words, given a source s and a set T of targets, find all shortest paths from s to all T. This may be done by performing a unidirectional CRP search from s descending at any cell that contains a vertex t in T. This is guaranteed to find the shortest path from s to all T.

Figure 5:
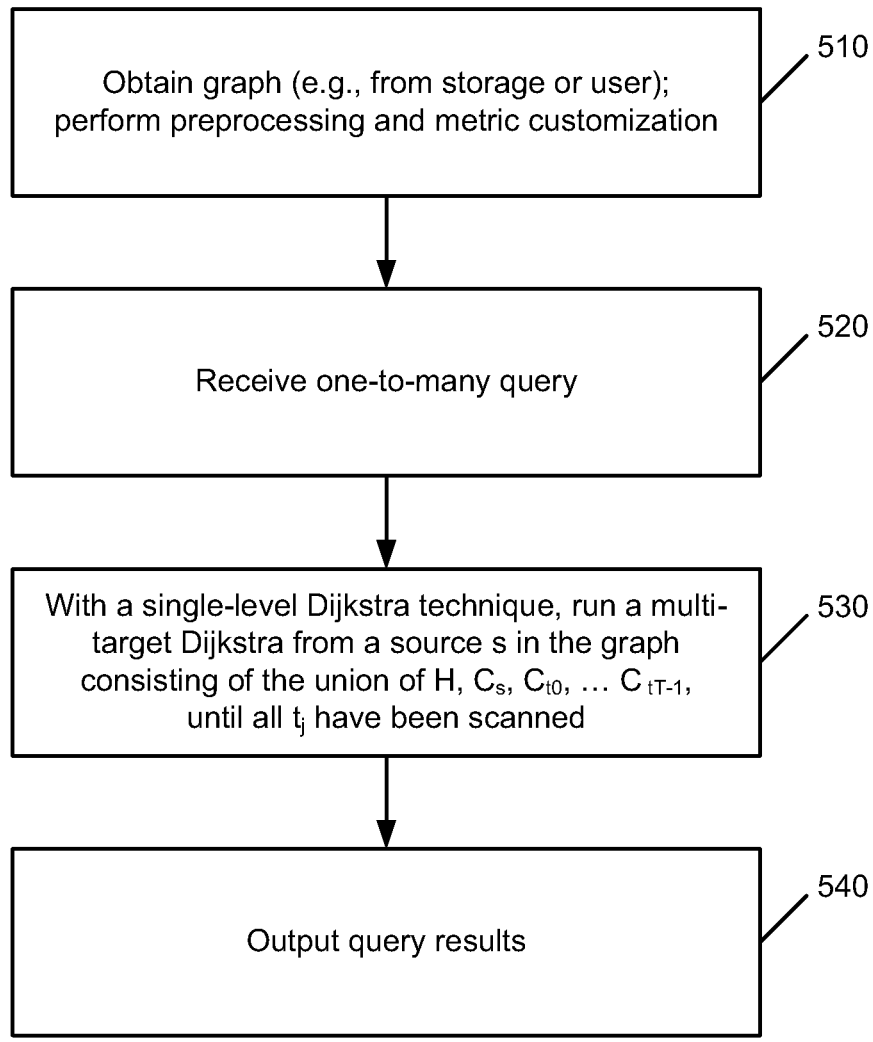
FIG. 5 is an operational flow of an implementation of a method of a one-to-many determination.

FIG. 5 is an operational flow of an implementation of a method 500 of a one-to-many determination. In an implementation, a CRP technique can be used to accelerate the one-to-many determination as follows.

At 510, a graph is obtained, e.g., from storage or from a user, and preprocessing and metric customization may be performed using techniques set forth above, for example. At query time, at 520, a one-to-many query is received. At 530, with a single-level Dijkstra technique, a multi-target Dijkstra can be run from a source s in the graph consisting of the union of H, $C_s$, $C_{t0}$, ... $C_{tT-1}$, until all $t_j$ have been scanned. The results are outputted at 540, e.g., to the user or to storage. Thus, build a restricted graph $G_{sT}$, where an arc (v,w) from $H_i$ is in $G_{sT}$ if v and w are in the same cell as s or any $t_j$ at level i+1. The one-to-many technique of FIG. 5 may be extended to a multi-level setup, depending on the implementation.

Note that this approach works well if all targets in T are close to each other because then $G_{sT}$ is small, and thus are queries. However, for an adversarial choice of T, $G_{sT}$ may equal G, resulting in no speedup over running Dijkstra's algorithm on G, but it will not be asymptotically slower either.

The distance table problem may be defined as given a set of sources S and a set of targets T, compute a distance table D=S×T containing all shortest path distances from vertices in S to vertices in T. Conventionally, a known bucket approach is used, in which the work is divided into two phases. The first phase runs an upward backward search from each target $t_j$ in the set of targets T. When running a search from $t_j$, store for each vertex u scanned the tuple ($t_j$,dist(u,$t_j$)) in the bucket B(u) of u. The second phase runs a forward search from each source $s_i$ in the source set S. Whenever the search scans a vertex u with a non-empty bucket B(u), the bucket is scanned and checked for each ($t_j$,dist(u,$t_j$)) whether dist(s,u)+dist(u,$t_j$) improves the entry for s, $t_j$ in D. If it does, D is updated accordingly.

In an implementation, this approach is adapted to CRP. In this case, buckets do not need to be maintained for all vertices that are scanned with the backward searches. Using the fact that each shortest path ending at a target t and originating from a different cell passes through a boundary vertex of one of the cells t is assigned to, there is only a need to keep buckets for boundary vertices.

Figure 6:
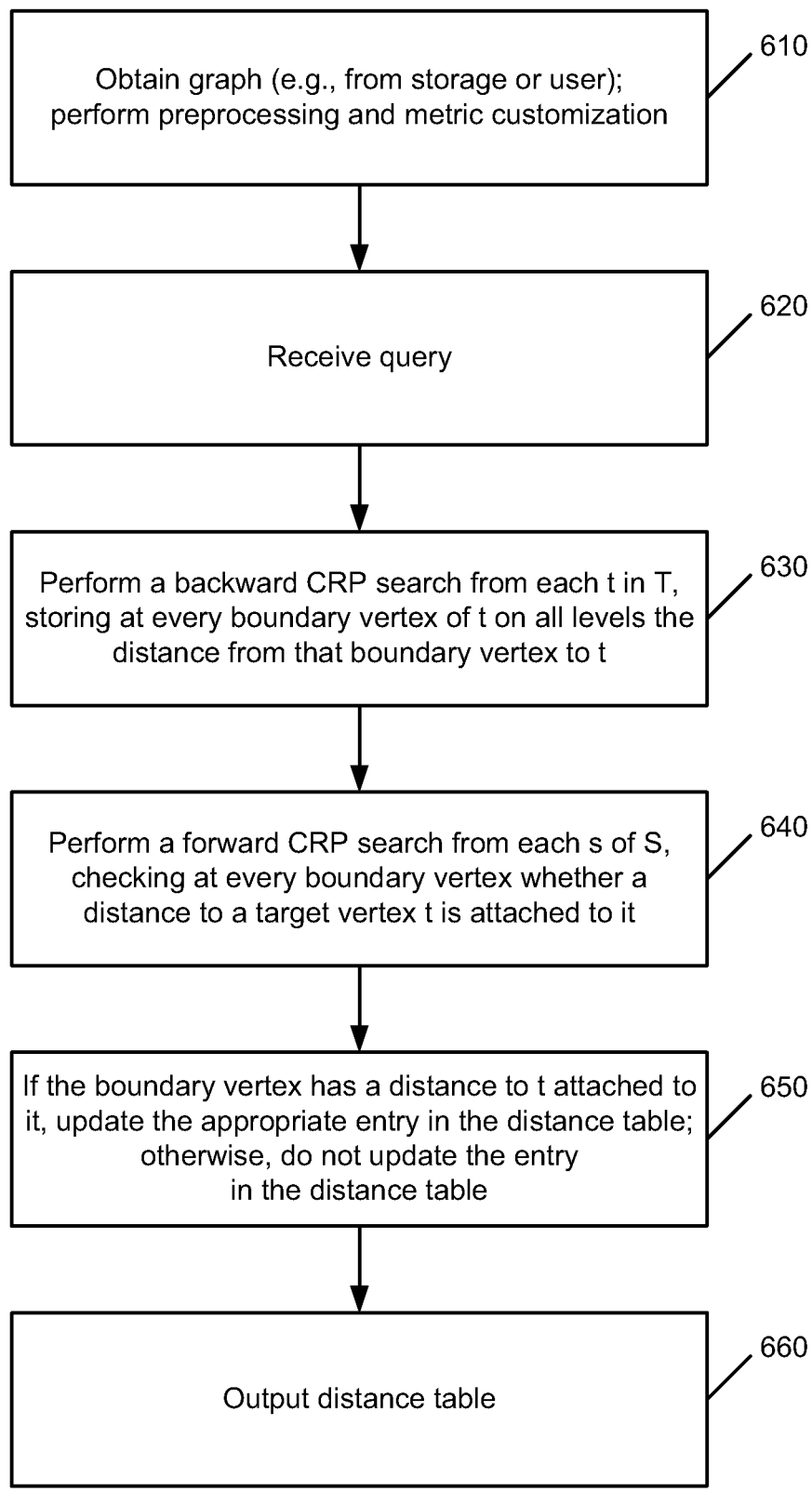
FIG. 6 is an operational flow of an implementation of a method computing distance tables.

FIG. 6 is an operational flow of an implementation of a method 600 computing distance tables. At 610, a graph is obtained, e.g., from storage or from a user, and preprocessing and metric customization may be performed using techniques set forth above, for example. At query time, at 620, a query is received. At 630, a backward CRP search is performed from each t in T, storing at every boundary vertex of t on all levels the distance from that boundary vertex to t. Then, at 640, a forward CRP search is performed from each s of S, checking at every boundary vertex whether a distance to a target vertex t is attached to it. If it is, the appropriate entry in the distance table D is updated at 650; otherwise, the entry in the distance table D is not updated. At 660, the completed distance table is outputted, e.g., to the user or to storage.

More particularly, in an implementation, the CRP-bucket approach may operate as follows. First, run a backward search for each t on a restricted graph $G'_t$, which contains an arc (v,w) from $H_i$ if both v and w are in the same cell as t at level i+1. However, $G'_t$ contains no edges from the highest overlay graph $H_L$, except for all incoming boundary arcs of $c_L(t)$. When running the backward search from t on $G'_t$, scan all reachable tail vertices of the boundary arcs of any $c_i(t)$. For each such vertex v, build a bucket using a known technique: each entry in the bucket for v is a pair (t,d(t)) representing a vertex t and the distance from v to t. Moreover, maintain a bucket with (t,0) for each target (to allow the algorithm to find shortest paths that do not cross cell boundaries). Then perform a forward search from each s on a restricted graph $G'_s$, which is built analogously to $G'_t$ except for the fact that it contains the highest overlay graph in full. Whenever a vertex v is scanned, scan its associated bucket B(v) in full (if it exists), updating the distance table accordingly.

Figure 7:
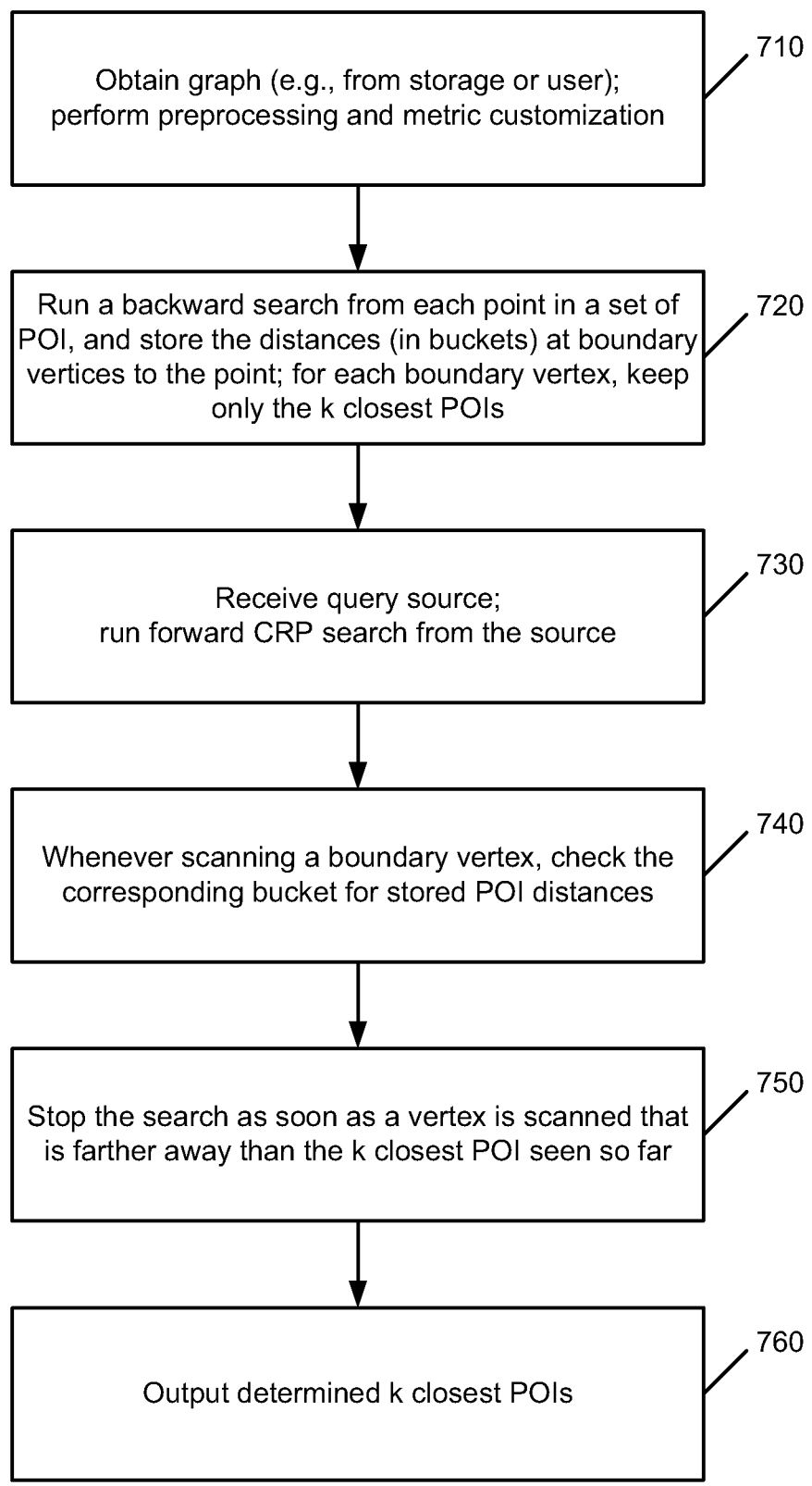
FIG. 7 is an operational flow of an implementation of a method of determining a set of points of interest.

In modern map applications, there is often a fixed (or slowly changing) set P of points of interest (POI) such as gas stations, restaurants, or coffee shops, for example. A common query scenario is to find the closest POI to a given source vertex. Another common query scenario is to find the k closest POIs to a given source vertex, for some fixed k. FIG. 7 is an operational flow of an implementation of a method 700 of determining the k closest among a set of points of interest. More particularly, closest POI may be determined using CRP.

At 710, a graph is obtained, and preprocessing and metric customization are performed. Given a predefined set of points of interest P, determine the distance from any source s to its k closest POI. This may be performed with CRP by running a backward search from each p of P (as for many-to-many) at 720, and storing the distances (in buckets) at boundary vertices to p. However, for each boundary vertex, keep only the k closest POIs, with k being known in advance.

At 730, a query source s is received, and a forward CRP search is run from s. At 740, whenever scanning a boundary vertex, the corresponding bucket is checked for stored POI distances. At 750, this search may be stopped as soon as a vertex is scanned that is farther away than the k-closest POI seen so far. The determined POIs may be outputted at 760.

Thus, in an implementation, a query is received and the previously determined POIs may be used in answering the query. For example, if interested only in the k closest POIs, each bucket keeps only the k closest POIs. Moreover, during the query, keep a sorted list (or a heap) of size k with the k best POIs seen so far. As soon as a vertex is scanned during the forward search with a distance label greater than the distance to the k-th POI found so far, stop the search.

Another query scenario in map services is computing isochrones. The goal is to find all regions of the graph that are reachable within a given amount of time from a fixed source. More precisely, given a source vertex s and a parameter x, determine all arcs (u,v) with dist(s,u)≤x and dist(s,v)>x. These arcs are referred to as the isochrone arcs. One approach is to run Dijkstra's algorithm from s until all elements in the priority queue have distance label greater than x, then select the appropriate arcs from those visited. This works reasonably well, but only if x is small.

Figure 8:
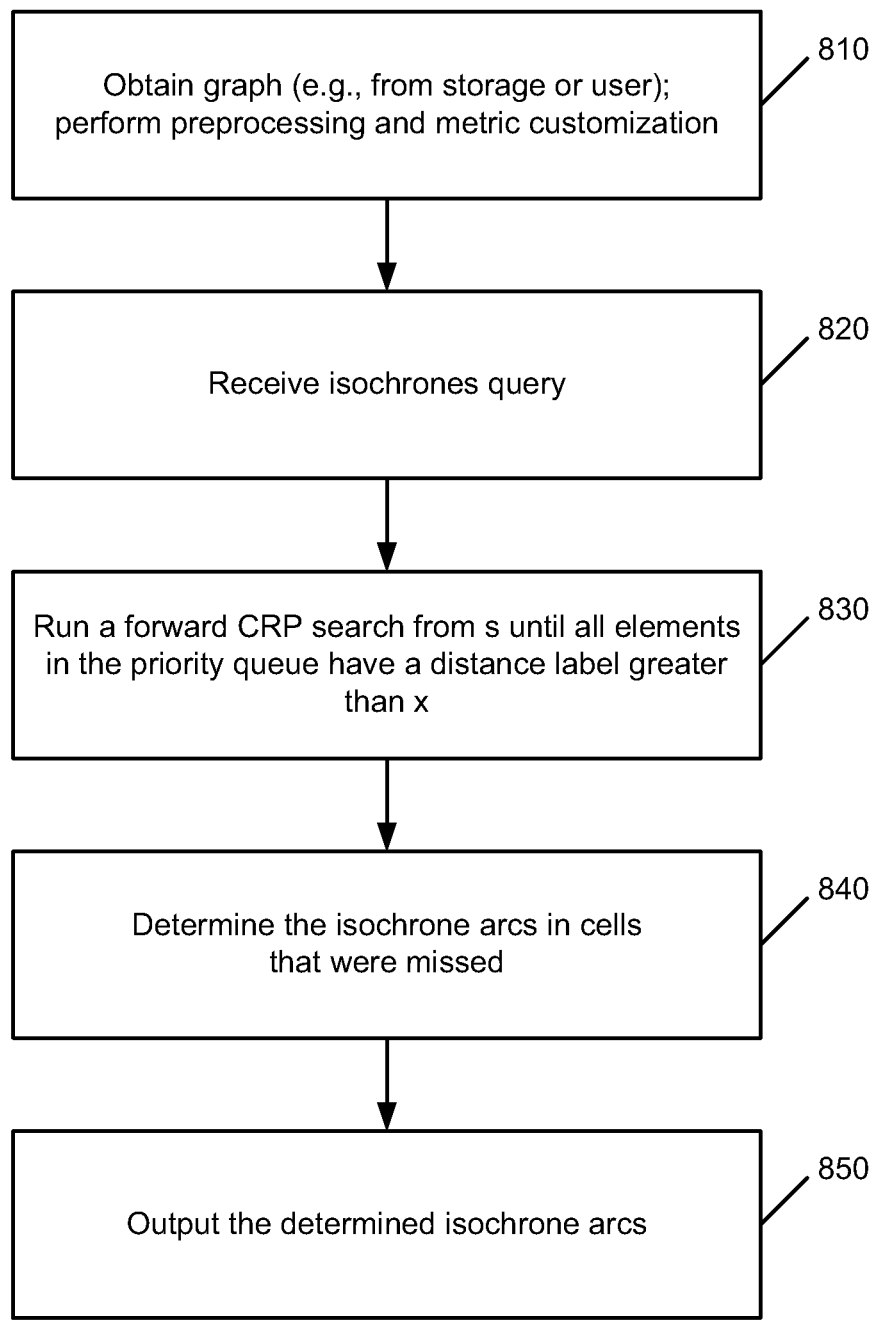
FIG. 8 is an operational flow of an implementation of a method of determining isochrones.

In an implementation, use CRP to accelerate the computation of isochrones as follows. FIG. 8 is an operational flow of an implementation of a method 800 of determining isochrones. At 810, a graph is obtained, preprocessing and metric customization are performed, and an isochrones query is received at 820. At 830, run a forward CRP search from s in $G_s$ until all elements in the priority queue have a distance label greater than x.

Since shortcuts were used during the search, cells that contain isochrone arcs may have been jumped over or missed. At 840, determine these arcs. Let L' be the highest level on which a vertex was scanned during this search. The second stage of the technique operates in L' rounds. In round i, determine the parents v of vertices u such that dist(s,v)≤x, dist(s,u)>x, with v and u being scanned on level L'−i+1. If (v,u) is an original arc or a boundary arc, check for all outgoing arcs from v whether it is an isochrone arc. Otherwise, the arc is a shortcut, which means that the cell it jumps over may contain additional isochrone arcs. Mark all such cells. For each cell C, run Dijkstra on $H^{L'-1}$ restricted to C with the priority queue initialized by the boundary vertices of C with the previously computed distance labels. Use the same stopping criterion as before. Continue this approach until only vertices on level 0 (in round L') are scanned. The determined isochrones arcs may be outputted at 850.

In some implementations, the above approach may not find some of the isochrone arcs that should be reported, since they are not part of shortcut arcs. For example, consider a mountain road in the middle of a cell, and assume this road does not contain a cut edge. A query from a nearby city would jump over this cell, but it is possible that the summit of the mountain is not reachable with the given time limit. To properly identify these arcs, store some additional information. During the Dijkstra searches in the customization phase, for each boundary vertex v in the cell, check whether its farthest vertex w=f(v) in the cell is also a boundary vertex. If it is, it is determined that a situation as described above is not present during queries. If not, store the v-w distance (within the cell) with v. During queries, check for each vertex v scanned whether the distance to f(v) from s is greater than x. If it is, add the cell to the ones needed to restart the search from. Determining f(v) and the distance to it can be done during customization. When constructing $H_1$, run a Dijkstra search from each boundary vertex anyway. However, in a multi-level setup, when computing $H_2$, only use $H_1$ and do not look at all vertices of the graph. Hence, store for each level-1 cell the length of the longest shortest path and add this value for determining the path length when scanning the vertices on $H_1$. This provides a safe upper bound to the length to the farthest vertex in this cell.

CRP provides fast customization times which enable real-time traffic updates. The overlay graphs can be updated whenever a new traffic situation is available, as described above.

When computing a long journey, however, it may make sense to take the current traffic into account only when evaluating edges that are sufficiently close to the source. By the time the user actually gets to far away edges, the traffic situation will most likely have changed. Thus, two length functions may be used, l (travel time without traffic) and $l^T$ (travel time with traffic), and computing the fastest route from s to t using $l^T$ only for the first x minutes, and l afterwards. These paths may be obtained by running Dijkstra's algorithm in $G^T$ (weighted by $l^T$) and switching to G (weighted by l) as soon as a vertex v is scanned with dist(s,v)>x.

Figure 9:
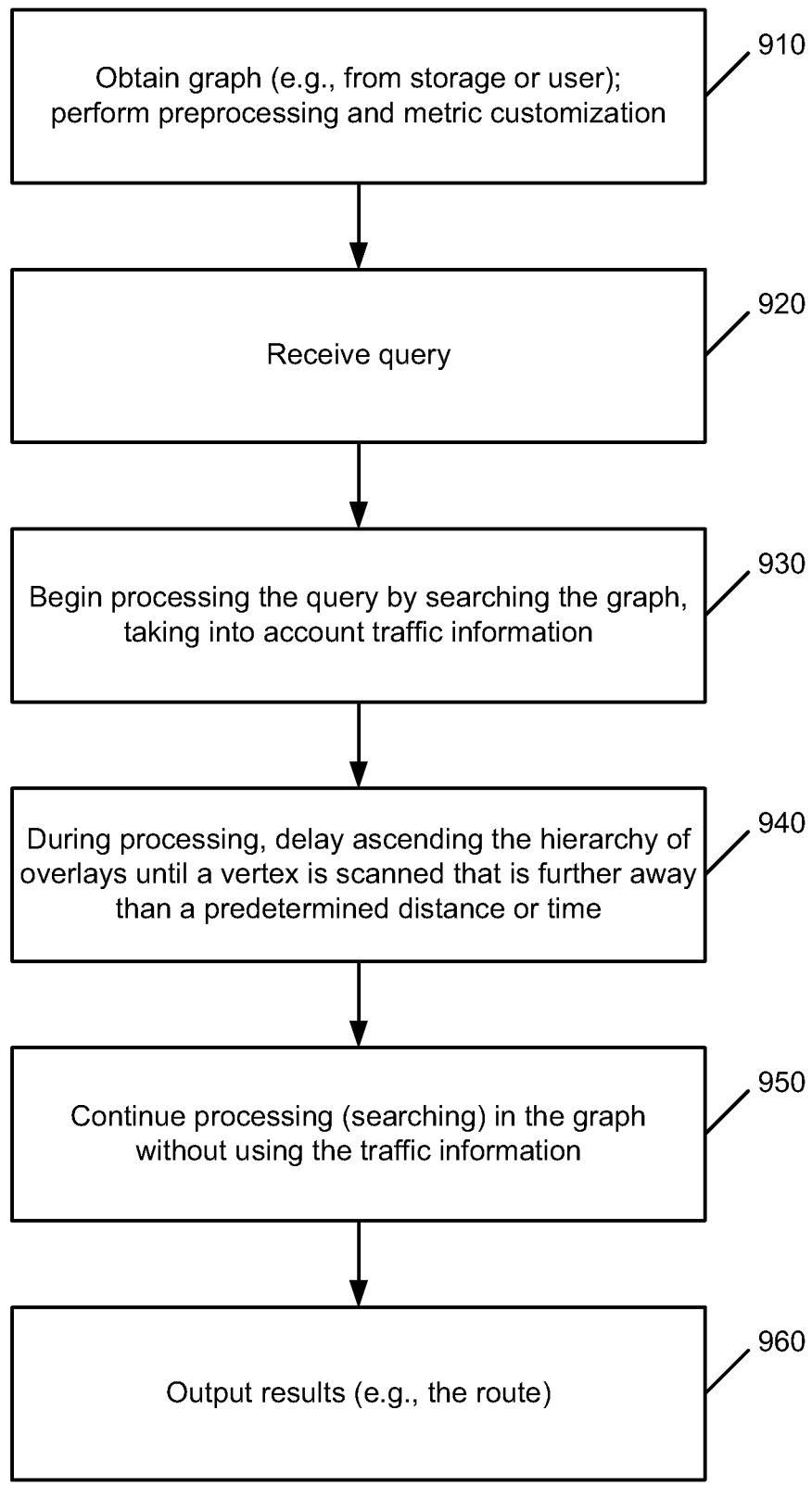
FIG. 9 is an operational flow of an implementation of a method of determining routes.

FIG. 9 is an operational flow of an implementation of a method 900 of determining routes. In an implementation, determining and computing best routes in traffic may be performed with CRP, using the overlay graphs both with and without traffic.

At 910, a graph is obtained, e.g., from storage or from a user, and preprocessing and metric customization may be performed using techniques set forth above, for example. At query time, at 920, a query is received. At 930, the search in the graph is started with traffic (i.e., using traffic information). Ascending the hierarchy of overlays is delayed until, at 940, a vertex is scanned that is further away than a predetermined distance or time (when the traffic situation most likely will have changed, such as one hour, two hours, etc.). Then at 950 continue searching in the graph without traffic (i.e., without using the traffic information). The route is outputted at 960. This technique can be used for other routing techniques as well, in addition to CRP.

In an implementation, similar paths may be determined faster with CRP. To do so, maintain two sets of overlays, $H_i$ and $H^T_i$, one for each length function. When running an s-t query, assemble two search graphs $G_{st}$ and $G^T_{st}$. Start a forward search from s in $G^T_{st}$ (phase 1) and as soon as a vertex v is scanned with dist(s,v)>x, switch to $G_{st}$ (phase 2). Because it is unknown whether t is farther away than x, delay the start of the backward search from t until the beginning of phase 2. Note that if dist(s,t)<x, this path will be identified during the first phase of the query. Also, to avoid relaxing very long shortcuts during the first phase, build $G^T_{st}$ from $c_0(s)$, $c_0(t)$, and the full level-0 overlay $H_0$ (this is equivalent to a one-level overlay setup). When doing this, include some more edges in $G_{st}$, which is built from all overlays. More precisely, extend $G_{st}$ by an edge (u,v) of $H_i$ if u or v were scanned during the first phase.

Note that CRP is also capable of computing time-dependent routes which are useful when including historic traffic information into route optimization. The common approach to this is to assign a travel time function to each edge of the graph, representing the time to traverse the road segment at a certain time of the day. For CRP, store more costly time-dependent shortcuts, but known compression methods may be used.

A common feature for map service applications is to report alternative routes besides the best route. While the best route is clearly defined by the shortest path in the underlying graph, alternatives are harder to determine.

Figure 10:
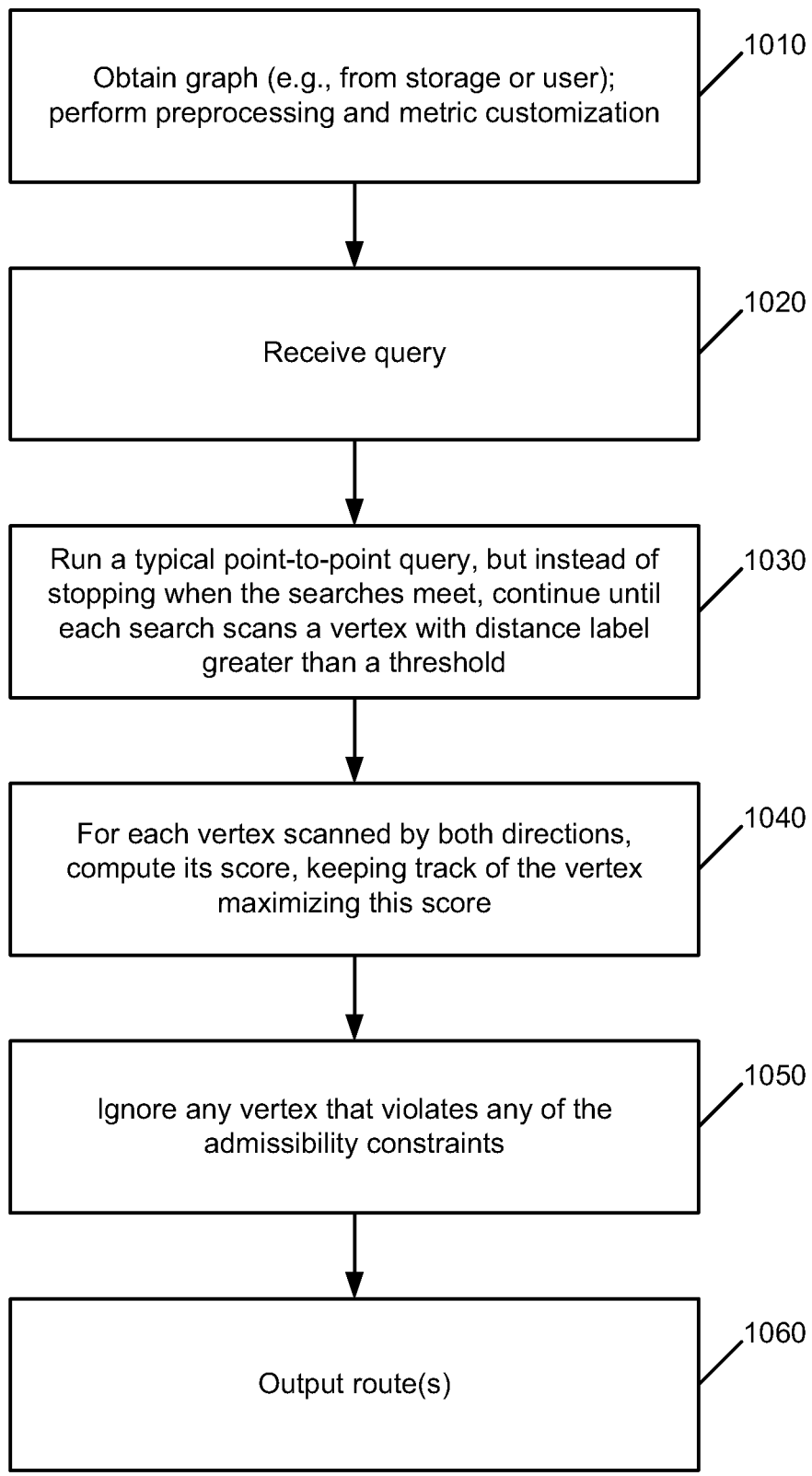
FIG. 10 is an operational flow of an implementation of a method of determining alternative routes.

FIG. 10 is an operational flow of an implementation of a method 1000 of determining alternative routes. In an implementation, CRP may be used to find a single via path (which are the concatenation of two shortest paths) as follows. At 1010, a graph is obtained, e.g., from storage or from a user, and preprocessing and metric customization may be performed using techniques set forth above, for example. At query time, at 1020, a query is received. At 1030, run a typical point-to-point query, but instead of stopping when the searches meet, continue until each search scans a vertex with distance label greater than a threshold (e.g., (1+ε)·dist(s,t)). For each vertex v scanned by both directions, at 1040, compute its score f(v)=2l(v)+σ(v)−pl(v), keeping track of the vertex maximizing this score. l(v) is the length of the path s-v-t (where s-v-t paths are defined by a vertex v and the source s and target t of the query), σ(v) indicates how much that path shares with the shortest, and pl(v) is the plateau length which gives a bound on the local optimality of the path.

Note that σ(v) can be computed when evaluating each scanned vertex in increasing distance from s and t, respectively. At 1050, ignore any vertex v that violates any of the well-known admissibility constraints:

$l(v) < (1+\epsilon') \cdot l(Opt); \quad \sigma(v) < \alpha' \cdot l(Opt); \quad \text{or} \quad pl(v) > \gamma' \cdot l(Opt),$ where Opt is the shortest path in the graph G from s to t. This ensures that no bad routes are reported to the user at 1060. Typical values for α', γ', and ε' are 0.8, 0.25, and 0.3, respectively, although any values may be used depending on the implementation.

To compute multiple alternatives, use a similar method, but extend the definition of sharing to the sum of lengths of the edges a path has in common with Opt and any previously selected alternative.

Figure 11:
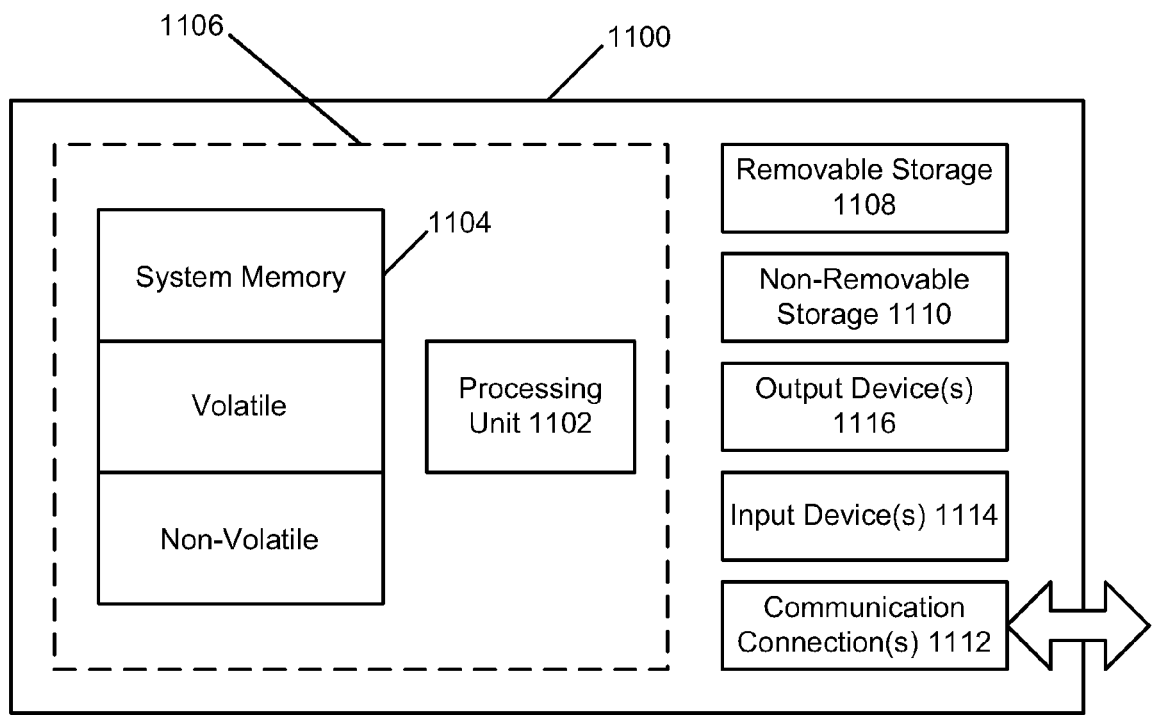
FIG. 11 shows an exemplary computing environment.

FIG. 11 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by computing device 1100 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A route planning method comprising:
   receiving as input, at a computing device, a graph comprising a plurality of vertices and edges;
   partitioning the graph into a plurality of components of bounded size;
   generating an overlay graph by replacing each component of the plurality of components with a clique connecting boundary vertices of the component of the plurality of components, wherein each clique comprises vertices and edges of the plurality of vertices and edges;
   for each of the plurality of cliques, determining a weight for each of the edges of the clique using the partitioned graph; and
   performing, by the computing device, a customizable route planning (CRP) computation in response to a query, the CRP computation comprising:

determining a path comprising a plurality of shortcuts, each shortcut comprising an improvement in at least one of time and distance;

unpacking a first shortcut in the plurality of shortcuts by accessing a cache to determine if the first shortcut is a frequently used shortcut of a plurality of frequently used shortcuts that is stored in the cache, wherein each frequently used shortcut is associated with a counter; and when the first shortcut is stored in the cache:

retrieving the first shortcut and using the first shortcut for generating a result to the query;

incrementing the counter associated with the first shortcut; and removing at least one frequently used shortcut from the cache whose associated counter is below a threshold.

2. The method of claim 1, wherein the CRP computation comprises a one-to-many shortest path computation.

3. The method of claim 1, wherein the CRP computation comprises determining a set of isochrones.

4. The method of claim 1, wherein the CRP computation comprises determining a shortest path using traffic information.

5. The method of claim 1, wherein the CRP computation comprises determining a plurality of alternative routes.

6. The method of claim 1, further comprising:

storing data corresponding to the overlay graph as preprocessed graph data in storage associated with the computing device; and storing data corresponding to the weights of each of the edges of the cliques in storage associated with the computing device.

7. The method of claim 1, wherein the partitioning the graph and the generating the overlay graph are performed during a metric-independent preprocessing stage, and wherein the weights of each of the edges of the cliques are determined during a metric customization stage, wherein the metric-independent preprocessing stage is based on the graph without taking any of the edge weights into account and wherein the metric customization stage uses the edge weights.

8. The method of claim 1, wherein the graph represents a network of nodes.

9. The method of claim 1, wherein the graph represents a road map.

10. The method of claim 1, wherein when the first shortcut is not stored in the cache, then performing a search, determining a second shortcut, and storing the second shortcut in the cache for later use as another frequently used shortcut.

11. The method of claim 1, wherein the cache is a least recently used (LRU) cache of a predetermined size based on at least one of storing a limited number of shortcuts that are frequently used shortcuts, or storing a limited number of shortcuts that may be used at a later time as frequently used shortcuts.

12. The method of claim 1, wherein the cache is a least recently used (LRU) cache that is configured to store a level-i shortcut as a sequence of level-(i-1) shortcuts.

* * * * *